Oct. 19, 1926.

J. R. WILLIAMS 1,603,569

CULLING AND WEED PULLING MACHINE

Filed August 21, 1925

Inventor

John R. Williams

Oct. 19, 1926.

J. R. WILLIAMS 1,603,569

CULLING AND WEED PULLING MACHINE

Filed August 21, 1925     4 Sheets-Sheet 2

Inventor

John R. Williams

Inventor
John R. Williams

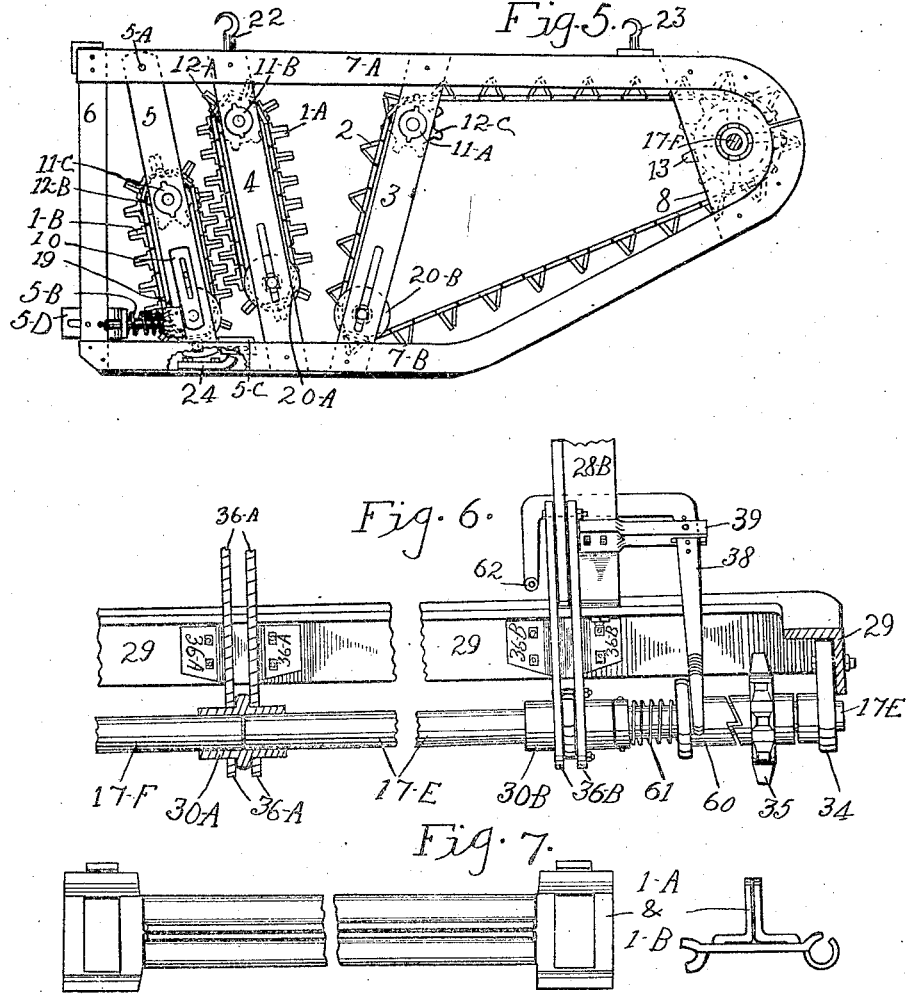

Patented Oct. 19, 1926.

1,603,569

UNITED STATES PATENT OFFICE.

JOHN R. WILLIAMS, OF MITCHELLTON, SASKATCHEWAN, CANADA.

CULLING AND WEED-PULLING MACHINE.

Application filed August 21, 1925. Serial No. 51,641.

My invention relates to a new and useful culling and weed pulling machine, especially adapted for culling weeds with thick and firm stems out of growing crops of grains and grasses with thin and flexible stems.

And comprises a simple and efficient apparatus for said purpose. having various details of construction, and arrangements of parts, which are hereinafter fully and clearly described, and pointed out in the appended claims.

I illustrate my invention in the accompanying drawings in which:—

Fig. 5 is a side elevation of the left-hand side pulling section showing the exact position of the reel and pulling conveyers, as mounted in the smaller frames.

Fig. 6 is an enlarged detail of the right-hand side clutch.

Fig. 7 is an enlarged detail of the conveyer slats.

Fig. 8 is an enlarged detail of the reel slats.

Similar characters of reference indicate corresponding parts in all the figures, throughout the accompanying drawings, which form a part of this specification.

Figure 1:
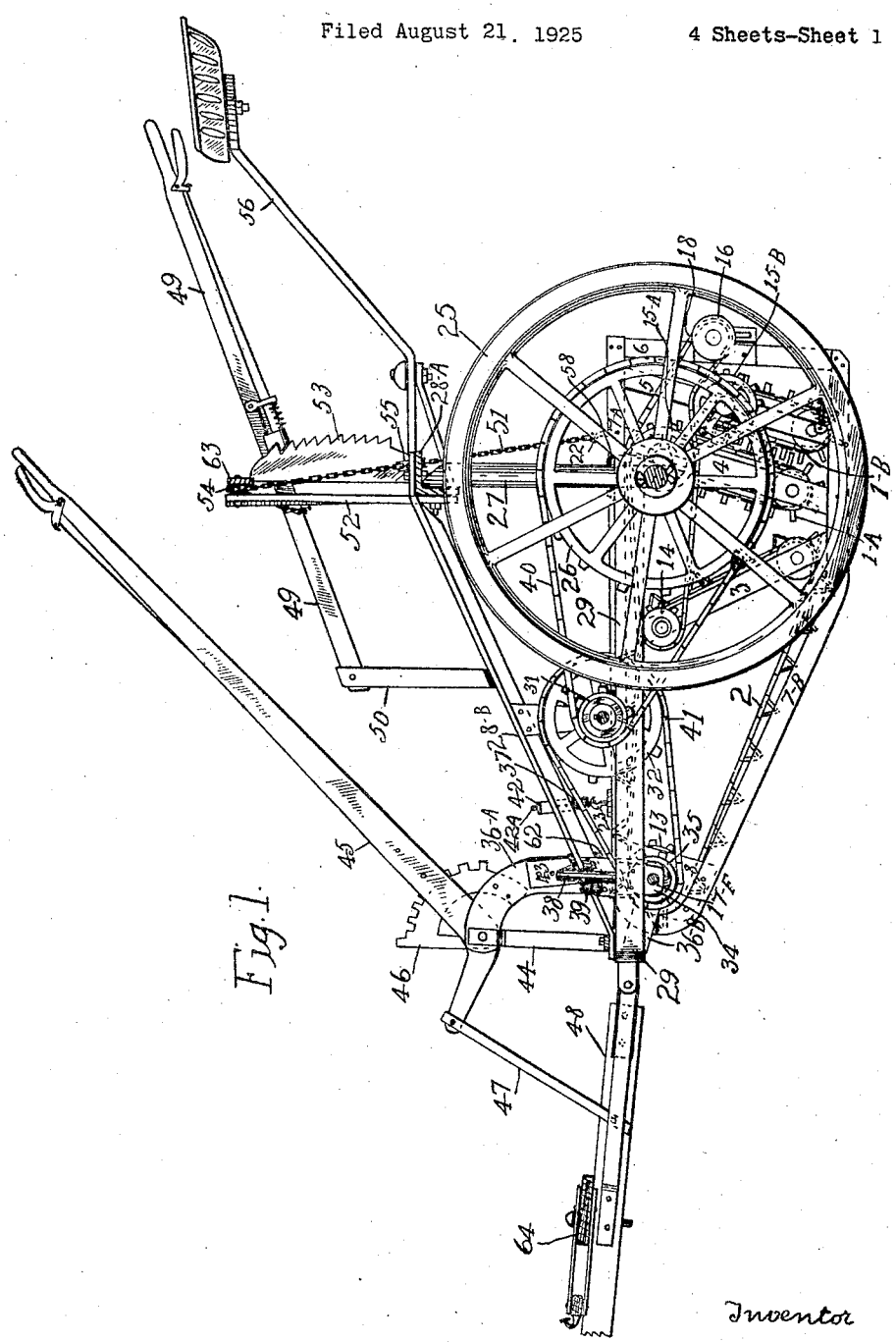
Fig. 1 is a side elevation view of the machine, showing the main frame and position of pulling section frames, levers and tongue.

I designate a main frame of any suitable size, which is pivotally mounted on the driving-wheels 25 and is supported at its front end by a tongue 48 to which whiffletrees 64 are fixed for hitching horses thereto; said tongue being pivotally fastened to said frame, and is connected to a tilting lever 45 by two vertical irons 47, and said lever provides means for raising and powering the front end of the machine.

Figure 2:
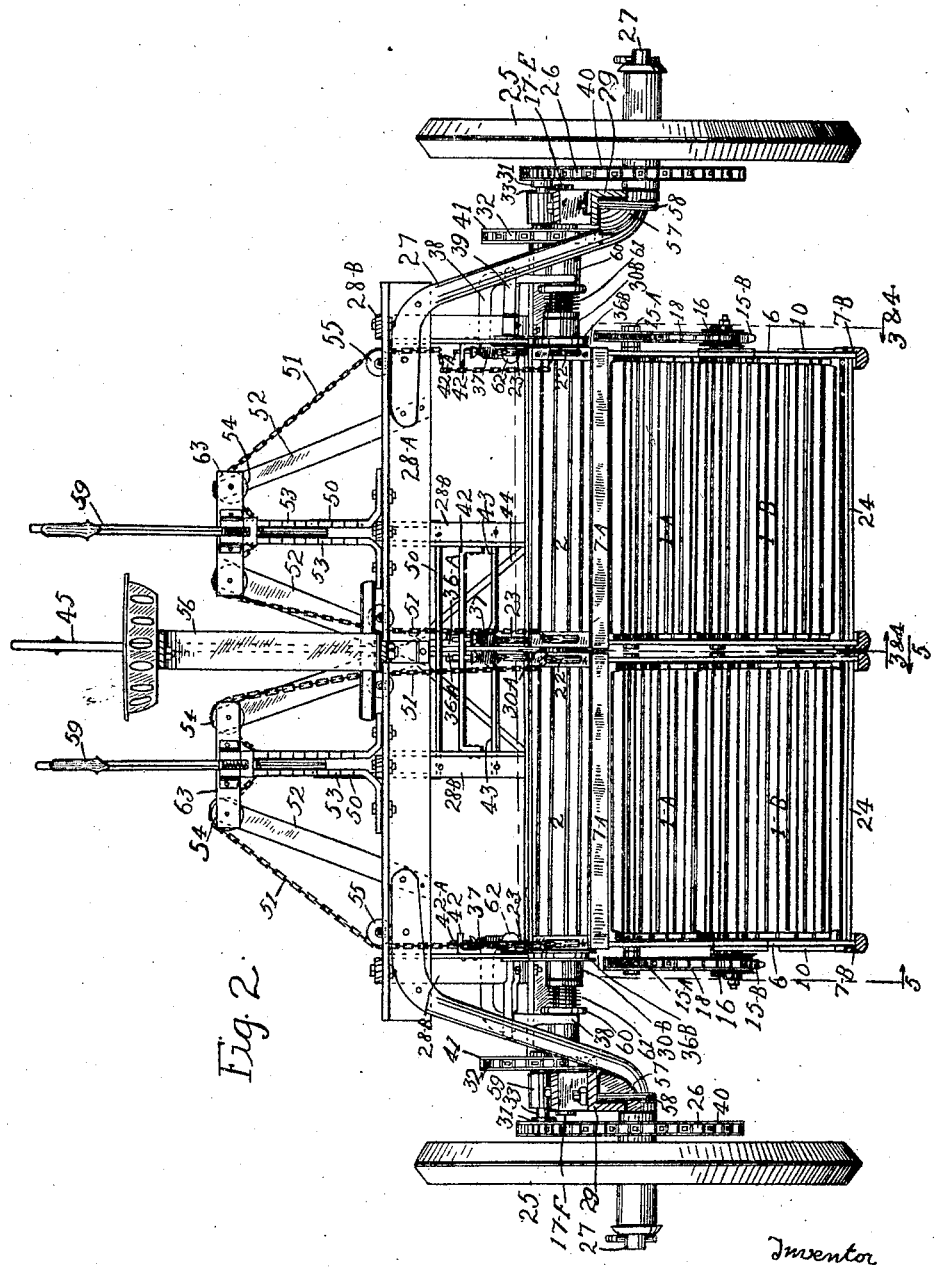
Fig. 2 is a rear view of the machine, showing the main frame, main drive-shafts and bearings, both driving-wheels, driving-sprockets, hoisting-chains, and pulling section.

The driving-wheels 25 are journaled on the axles 27 which are fastened to the angular frame beam 28$^A$ at their upper ends, and to the angular frame beam 29 by the shoulders 57 and clamps 58; said driving-wheels are provided with high center rims, as shown in drawings Figs. 1 and 2, being so arranged to divide the growing crops and thereby prevent running down the same, and also to give wheels better grip on the ground and prevent slipping.

Fastened to the hubs of said driving-wheels are sprocket-wheels 26 which are in alinement with sprocket-wheels 31 which are fixed to short shafts 33, and chain belts 40 passes about said sprocket-wheels and imparts a rotary motion on the shafts 33, to which are also fixed sprocket-wheels 32 which are in alinement with the sprocket-wheels 35, which are loosely mounted on the main drive-shafts, and are provided with teeth on their inner hubs adapted to intermesh with teeth 60 of the clutches, which will be further explained hereinafter, and chain belts 41 passes about said sprocket-wheels and imparts a rotary motion to the main drive-shafts, when said clutches are engaged.

Said main drive-shafts 17$^E$ and 17$^F$ being two separate shafts mounted to revolve end to end in the center bearing 30$^A$; each shaft being supported by two other bearings also, the bearings 34 at the other ends, which are fastened to the angular frame beam 29, and the bearings 30$^B$ which are secured in the brackets 36$^B$.

The brackets 36$^A$ and 36$^B$ consist of two wide irons bent into the desired shape with eyelets formed at the elbows, which take the bearings 30$^A$ and 30$^B$, said bearings each being provided with a collar around the middle thereof, which is secured between said bracket-irons when the same are fastened together as shown in Figs. 2 and 6; said brackets are bent at their lower ends and bolted to the angular frame beam 29 and are fastened to the angular braces 28$^B$ at their upper ends, the center bracket 36$^A$ is extended above the frame at its upper end and is supported by two members 43 and two vertical braces 44 as shown in Figs. 1 and 2.

There is a clutch collar 60 splined to each of said main drive-shafts which are provided with teeth upon one edge adapted to intermesh with those on the hubs of the sprocket-wheel 35, and a forked lever 38 is in contact with each of said clutch collars, which are pivotally fastened to frame braces 28$^B$ by the members 39.

Said levers are provided with friction-rollers 62 in one end which are adapted to come into contact with the angular frames 7$^A$ of the pulling sections when the same are raised clear up, which in turn acts upon the said levers and throws the clutches out of mesh with the sprocket-wheels 35, and are thrown into mesh and held in by the coiled springs 61 when the pulling sections are lowered, and the forked levers are released, see Fig. 6.

In this particular machine illustrated in the accompanying drawings, I designate two pulling sections, however more or less sections can be embodied in one machine as may be desired, by enlarging or diminishing the main frame.

Figure 3:
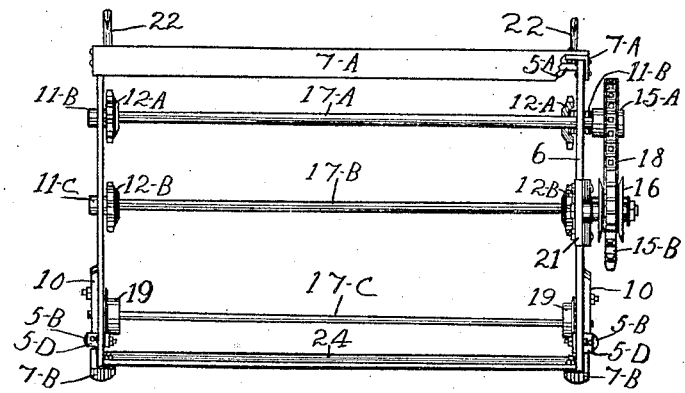
Fig. 3 is a rear view of the right-hand side pulling section, showing the conveyer shafts, and positions of the sprocket-wheels and flanged pulleys, with the reel and conveyers omitted.
Figure 4:
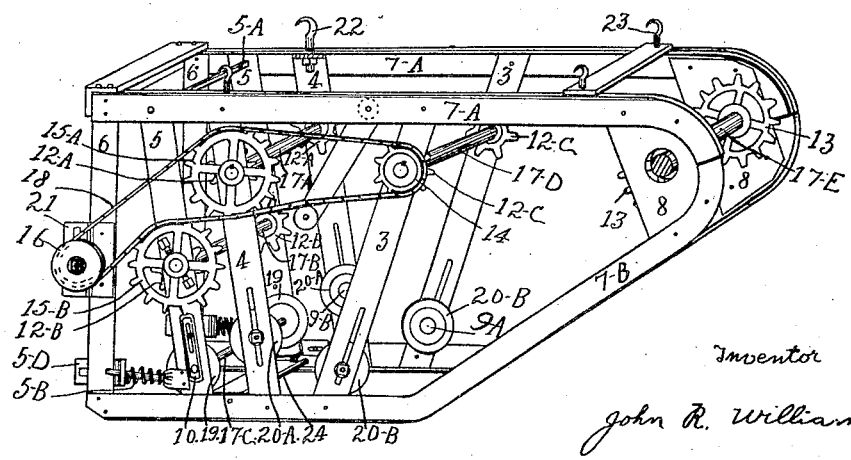
Fig. 4 is a detailed view of the right-hand side pulling section, showing the various sprocket-wheels, flanged-pulleys, shafts, and means for adjusting the reel and pulling conveyers, with the reel and conveyers omitted.

Said pulling sections are pivotally supported at their front ends, adjacent the front end of the main frame, by means of the members 8, which are fastened to the front end of said sections, which has eyelets in the centre thereof which take the bearings 30$^A$ and 30$^B$ and pivots on the same. Each of said section being arranged to fit snugly between the brackets 36$^A$ and 36$^B$; and are also connected to the main frame by four tension-spring 37 and two hoisting chains 51; said tension-spring being for the purpose of carrying part of the weight of the pulling sections, to lessen the weight on the hoisting-levers, and are tensionally adjustable by swiveled and threaded bolts or pins 42$^A$ which are inserted in the members 42 on the main frame, and are connected to the hooks 23 on the pulling sections. Said hoisting-chains 51 are connected to hooks 22 on the pulling sections, and are passed upwards through recesses in the angular frame 28$^A$, over the grooved-pulleys 55 and 54 and are fastened to the hoisting levers 59, said hoisting-levers are conveniently placed, one on each side of the seat 56, and are pivotally fastened to standards 50 at their forward ends, and adapted to work in the slots formed between the notched standards 53, as shown in Fig. 2. Said pulleys 55 are turnable in recesses in the angular frame 28$^A$ and are in alinement with the pulleys 54 which are turnable on large bolts or pins connecting the standards 52 and cross-irons 63;

Each of the said pulling sections comprises a frame of the desired size which is provided with three brackets on each side thereof, a bar underneath the rear brackets, a reel and two culling and pulling conveyers, as shown in Figs. 3, 4 and 5;

The brackets 3 are provided with bearings 11$^A$ at their upper ends in which the shaft 17$^D$ is mounted to turn, and bearings 9$^A$ at their lower ends on which the flanged-pulleys 20$^B$ are turnably mounted, said bearings are held in place by large bolts which are adapted to work in slots formed in said brackets and provides means for adjusting the reel.

The brackets 4 are provided with bearings 11$^B$ at their upper ends in which the shaft 17$^A$ is mounted to turn, and bearings 9$^B$ at their lower ends, on which the flanged-pulleys 20$^A$ are turnably mounted; said bearings are held to the brackets by large bolts, which work in slots formed in the brackets, and provides means for adjusting the front conveyer. Said brackets are bent at their upper ends to fit in with the angular frame 7$^A$ to reinforce the same where the hooks 22 are inserted, see Fig. 4.

The brackets 5 are pivotally supported at their upper ends, by means of a square rod 5$^A$ which extend across the pulling-section frame, and is inserted in squared holes in the brackets to hold the same rigidly in correspondence with each other as they swing backwards and forwards in their spring controlled manner at their lower ends;—

Said rod is rounded at its extreme ends to correspond with round holes in the angular frame 7$^A$ and pivots in same; said brackets being spring controlled at their lower ends by coiled-springs 5$^B$ which are tensionally adjustable by slotted-irons 5$^D$; said brackets are also adjustable towards and from the brackets 4 by slotted irons 5$^C$ which are fastened to frame shoes 7$^B$; and are provided with bearings 11$^C$ in which the shaft 17$^B$ is mounted to turn, and bearings 10 in which the shaft 17$^C$ is mounted to turn, said bearings being slotted to work on bolts inserted in the brackets to provide means for adjusting the rear conveyer, see Fig. 4.

The bar 24 is located underneath the rear brackets and serves as a guard for the rear conveyer, it being securely fastened to the frame-shoes 7$^B$ at each end, and is curved up on its forward edge to prevent it catching on the ground and to other foreign matter, see Fig. 5.

There is a reel 2 within the front end of each of the pulling section frames, which is rotatably mounted on the sprocket-wheels 13 and 12$^C$, and flanged-pulleys 20$^B$; the reel consists of a series of triangular shaped slats which are provided with a chain link in each end thereof, see Fig. 8; said slats are connected together in endless chains by means of the chain links in each end, and a loose chain link between each slat at each end thereof, as shown in Fig. 5, and a pair of co-operating culling and pulling conveyers within each of said frames, at the rear of the reel. The foremost of said conveyers 1$^A$ is rotatably mounted on the sprocket-wheels 12$^A$ and flanged-pulleys 20$^A$ and the rear conveyer 1$^B$ is rotatably mounted on the sprocket-wheels 12$^B$ and flanged pulleys 19; each of the said conveyers consists of a series of T shaped slats, connected together in endless chains by means of the chain links which are provided in each end of said slats, as shown in Figs. 5 and 7.

Said conveyors are rotatable in uniform motion in close relation to each other and the edges of the said slats, are adapted to intermesh with each other in an adjustable and spaced position, to perform a zigzag action on the stems of the growing plants, and will frictionally grip a weed or plant with a thick and firm stem, and pull it from the ground, and will have little or no pulling effect on a plant with thin and flexible stems or blades.

It will be noted with reference to the drawings, Fig. 5, that said conveyors have an upward and slightly rearward inclination, and that the foremost conveyer 1$^A$ is longer and is mounted higher, than the rear conveyor 1$^B$ which is mounted as low as possible over the bar 24, being so arranged to pick up the growing plants, which are bent backwards in a flattened down position by the reel 2, which rotates at a much greater speed than the pulling conveyors; the conveyors will rotate in a uniform motion upon forward movement of the machine, and the growing plants will naturally follow up between the pulling conveyors, with the forward motion of the machine; and the conveyors will not pull on the plants until the full length of the plants are between the conveyers, when the friction will be the greatest, and such weeds or plants with thick or firm stems will be pulled from the ground and passed up between the conveyers and dropped off over the rear conveyer, while such plants with thin and flexible stems or blades will slip out from between the conveyers without injury.

The foremost conveyer mounted within the brackets 4, is of rigid construction and not adjustable towards and from the rear conveyer, which conveyer is mounted on the brackets 5, and is spring controlled and yieldable to prevent breakage if some hard matter such as a piece of wood or rock should pass up between the conveyers, and is adjustable towards and from the front conveyer, and is also adjustable by the set-screws in the hub of the sprocket-wheel 15$^B$ to adjust or time said conveyer, with the other conveyer so as the slat edges will centre in a desired position.

There are two sprocket-wheels 13 fixed to each of the main drive-shafts, which carries, and drives the reels, which in turn drives the shafts 17$^D$ by passing about the sprocket-wheels 12$^C$ which are fixed to said shafts; there is also a sprocket-wheel 14 fixed to the outer end of each of the said shafts 17$^D$, which are in alinement with the sprocket-wheels 15$^A$ and 15$^B$ and the pulleys 16; and chain belts 18 passes about said sprocket-wheels and pulleys, which drives the conveyers, to reverse the rear conveyers said chain belts are passed over the top of the sprocket-wheels 15$^B$ on their backwards stroke as shown by Fig. 4.

The sprocket-wheels 15$^A$ and 15$^B$ being exactly the same size as well as the sprocket-wheels 12$^A$ and 12$^B$ render the conveyers rotatable in an exact uniform speed, to keep the staggered slats thereof spaced in a desired position; the sprocket-wheels 12$^A$ and 12$^B$ are compact and dished to overlie the bearings 11$^B$ and 11$^C$ to prevent dirt getting into said bearings. The reel and conveyers are readily accessible for repairing by loosening the bolts in the bearings 9$^A$ and 9$^B$ and 10 to slide said bearings upwards on the brackets which will render the reel and conveyers loose and pliant, so as to allow them to come apart in the same manner as any ordinary chain belting.

Said reel and conveyers are also extendible and contractible by adding or taking out slats as may be required.

Having thus described my invention I claim as new and desire to secure by Letters Patent:—

1. In a culling and weed pulling machine, a main frame, wheels operatively supporting the main frame, a plurality of smaller frames pivotally supported at their front ends adjacent the front end of the main frame, a reel within the front end of each of the smaller frames, a pair of co-operating weed pulling conveyers within each of the smaller frames, one of the conveyers being pivotally supported and adjustable towards and from the other conveyer, the slats of the said conveyers being staggered relatively to each other, and means for simultaneously operating the said reel and pulling conveyers.

2. In a culling and weed pulling machine, a main frame, driving-wheels operatively supporting the main frame, a plurality of smaller frames pivotally supported at their front ends adjacent the front end of the main frame, an endless reel having triangular slats within the front end of each of the smaller frames, a pair of endless weed pulling conveyers having T shaped slats within each of the smaller frames at the rear of the reels, one of the conveyers being of rigid construction and the opposing conveyer being yieldable and adjustable towards and from the other conveyer, the slats of the said conveyers being staggered relatively to intermesh with each other, and means to rotate said reel and pulling conveyers by a driving mechanism from the rotation of the driving-wheels of the main frame.

3. In a culling and weed pulling machine, wheels operatively supporting the main frame, a plurality of smaller frames pivotally supported within the main frame, resilient means supporting the smaller frames adjacent the front ends thereof, a reel within the front end of each of the smaller frames, a pair of co-operating weed pulling conveyers within each of the smaller frames at the rear of the reel, one of the conveyers being pivotally supported and automatically adjustable relatively to the other conveyer, the slats of the conveyers being staggered relatively to each other, and means for controlling and operating the reel and pulling conveyers.

4. In a culling and pulling machine, a main frame, wheels operatively supporting the rear end of the frame, means for adjusting the front end of the frame, a plurality of smaller frames pivotally supported within the main frame, and means for elevating and lowering the smaller frames, reels rotatably mounted within the front ends of the smaller frames, co-operating culling and pulling conveyers rotatably mounted within the smaller frames at the rear of the reels, and controlled means for driving the said reels and pulling conveyers from the rotation of the wheels of the main frame, substantially as set forth.

5. In a culling and pulling machine, a main frame operatively wheel supported, a plurality of smaller frames, pivotally supported within the main frame, a reel and a pair of co-operating pulling conveyers rotatably mounted within each of the smaller frames, an automatically controlled clutch mechanism for controlling the driving mechanism which drives the said reel and pulling conveyers, the said conveyers being staggered relatively to each other, to perform a zig zag action on the stems of the growing plants, and rotatable in an adjusted spaced position, and operated with a uniform motion, by the driving mechanism connected to the driving-wheels of the main frame, substantially as set forth.

In testimony whereof I have hereunto set my hand.

JOHN R. WILLIAMS.